(12) United States Patent
Funayama

(10) Patent No.: US 10,984,084 B2
(45) Date of Patent: Apr. 20, 2021

(54) SYSTEM, DEVICE MANAGEMENT SYSTEM, AND METHODS FOR THE SAME

(71) Applicant: CANON KABUSHIKI KAISHA, Tokyo (JP)

(72) Inventor: Hirotaka Funayama, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 346 days.

(21) Appl. No.: 16/047,897

(22) Filed: Jul. 27, 2018

(65) Prior Publication Data

US 2019/0034607 A1 Jan. 31, 2019

(30) Foreign Application Priority Data

Jul. 31, 2017 (JP) .............................. JP2017-148620

(51) Int. Cl.
*G06F 21/32* (2013.01)
*G06F 21/35* (2013.01)
*H04L 9/32* (2006.01)
*H04L 29/06* (2006.01)
*H04W 12/06* (2021.01)
(Continued)

(52) U.S. Cl.
CPC .............. *G06F 21/32* (2013.01); *G06F 21/35* (2013.01); *H04L 9/0866* (2013.01); *H04L 9/0894* (2013.01); *H04L 9/3231* (2013.01); *H04L 9/3234* (2013.01); *H04L 9/3247* (2013.01); *H04L 9/3271* (2013.01); *H04L 63/0823* (2013.01); *H04L 63/0861* (2013.01); *H04L 63/102* (2013.01); *H04L 63/12* (2013.01); *H04W 12/04* (2013.01); *H04W 12/06* (2013.01); *G06F 21/86* (2013.01); *G06F 2221/2103* (2013.01); *H04L 9/006* (2013.01)

(58) Field of Classification Search
CPC ... H04L 9/3234; H04L 63/0861; H04L 63/12; H04L 9/006; H04L 9/0866; H04L 9/3247; H04L 63/0823; H04L 9/3271; H04L 63/102; H04L 9/0894; H04L 9/3231; G06F 21/35; G06F 21/32; G06F 2221/2103; G06F 21/86; H04W 12/04; H04W 12/06
See application file for complete search history.

(56) References Cited

U.S. PATENT DOCUMENTS 10,609,254 B2 * 3/2020 Shirakawa ........... H04N 1/4406
2016/0036594 A1 2/2016 Conrad
(Continued)

FOREIGN PATENT DOCUMENTS

CN 106686004 A 5/2017
CN 106899551 A 6/2017
(Continued)

*Primary Examiner* — Baotran N To
(74) *Attorney, Agent, or Firm* — Canon U.S.A., Inc. IP Division

(57) ABSTRACT

A device management system according to the present invention transmits, in response to an authentication request from a network device, verification data generated by the device management system and a whitelist including identification information corresponding to a user managed in association with the network device, receives a signature generated according to biometrics for a user on a portable terminal and the whitelist, via the network device, and, in a case where verification of the signature is successful, responds to the network device to permit login by the user of the terminal.

7 Claims, 10 Drawing Sheets

(51) Int. Cl.
*H04L 9/08* (2006.01)
*H04W 12/04* (2021.01)
*H04L 9/00* (2006.01)
*G06F 21/86* (2013.01)

(56) References Cited

U.S. PATENT DOCUMENTS

| | | | |
|---|---|---|---|
| 2018/0341759 A1* | 11/2018 | Sato | H04L 9/0894 |
| 2018/0351739 A1* | 12/2018 | Ota | H04L 9/3213 |
| 2019/0141214 A1* | 5/2019 | Matsumoto | H04N 1/442 |
| 2019/0156020 A1* | 5/2019 | Sato | H04L 9/0894 |

FOREIGN PATENT DOCUMENTS

| | | |
|---|---|---|
| JP | 2013-122680 A | 6/2013 |
| JP | 2016-066217 A | 4/2016 |
| WO | 2016047064 A1 | 3/2016 |
| WO | 2017/043717 A1 | 3/2017 |

* cited by examiner

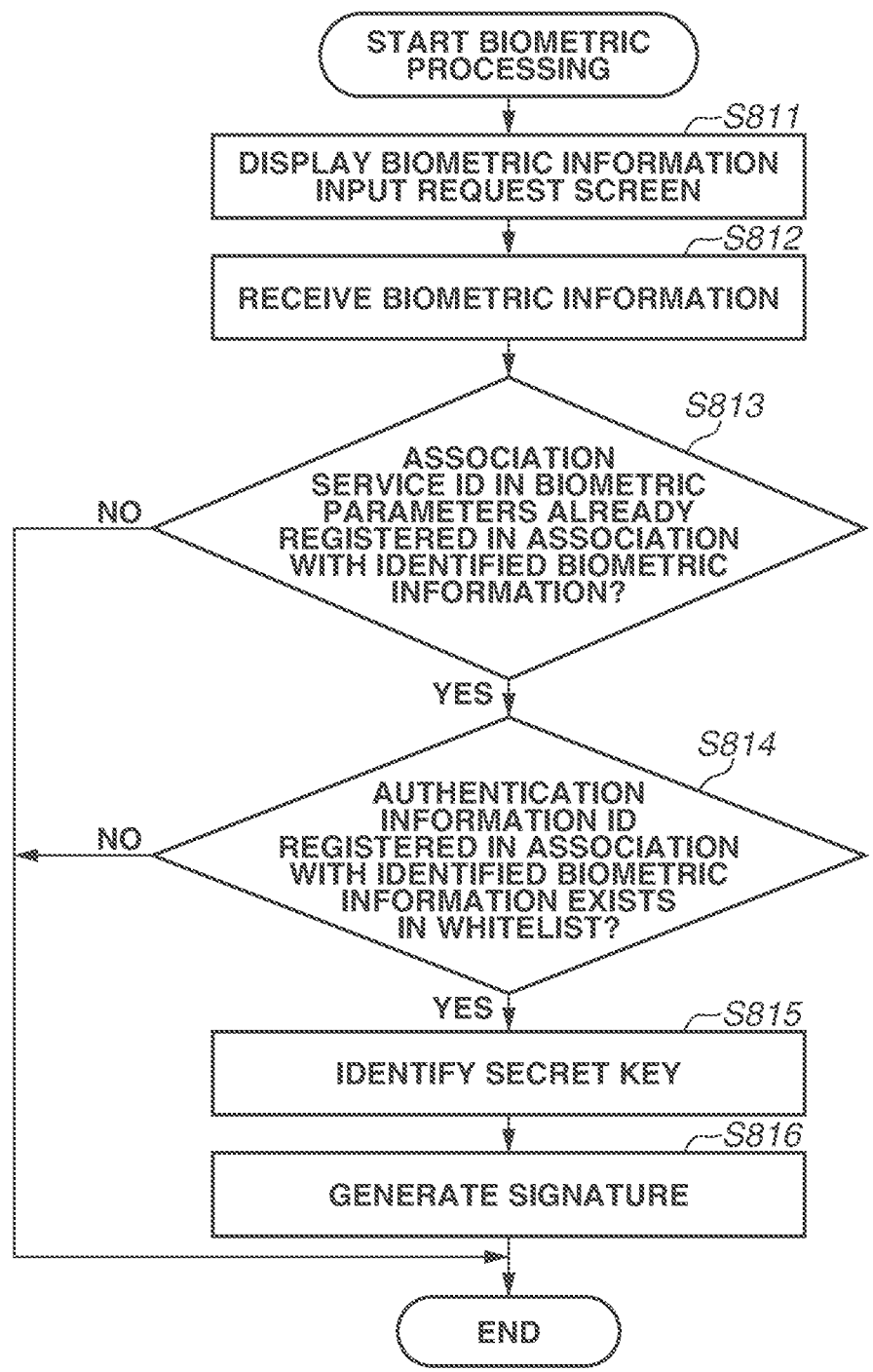

EXAMPLE OF SCREEN
DISPLAYED ON TERMINAL 141

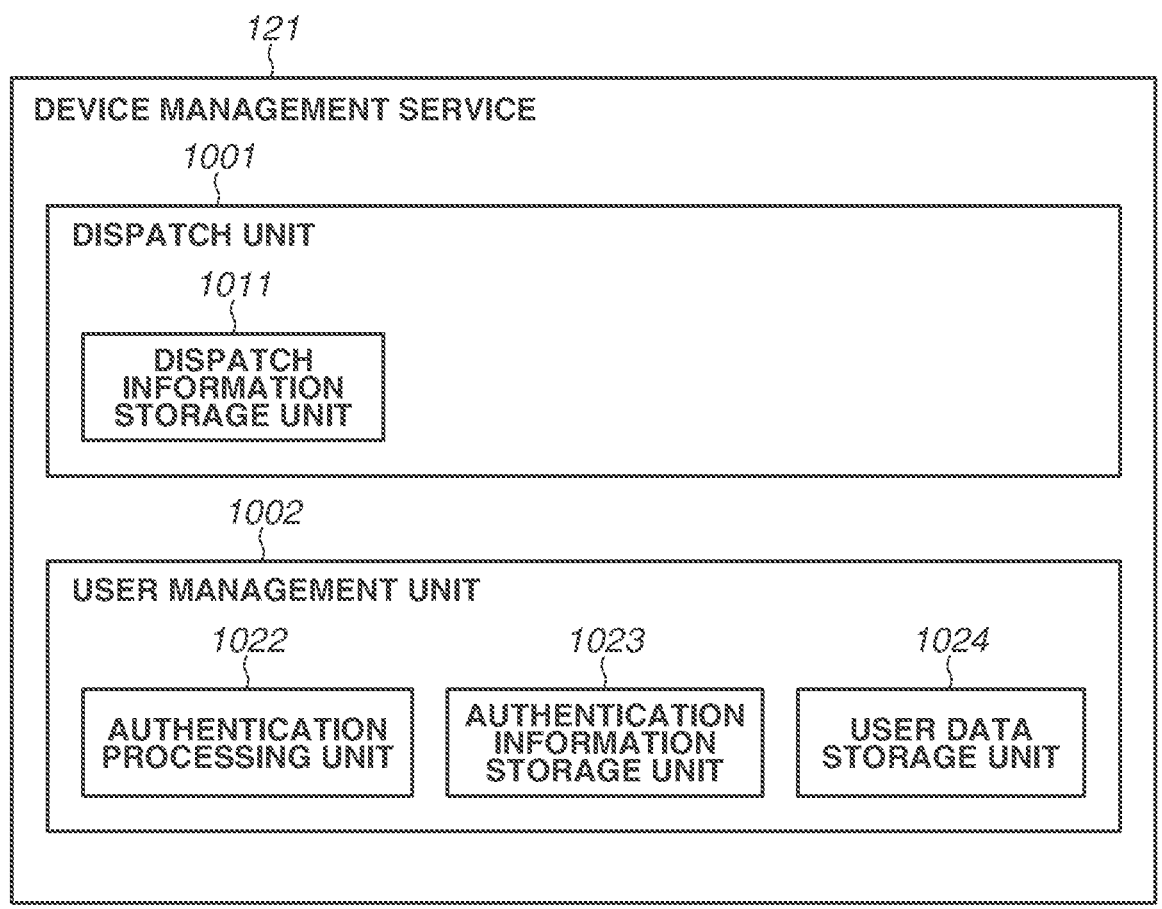

SYSTEM, DEVICE MANAGEMENT SYSTEM, AND METHODS FOR THE SAME

BACKGROUND OF THE INVENTION

Field of the Invention

The present invention relates to a technique for performing processing including biometrics on network devices including image processing apparatuses to use specific functions.

Description of the Related Art

Existing network devices are provided with a mode in which a specific administrator or a person in charge of maintenance performs special operations. For example, for the purpose of charging operation and maintenance, a service engineer needs to perform special operations, such as counter clearing, not intended to be performed by general users on image processing apparatuses. For this purpose, the image processing apparatuses need to be provided with special modes for special operations. The service engineer can use a special mode by inputting to an operation unit of an image processing apparatus a special command and authentication information which can be known only by the service engineer. Even an apparatus other than image processing apparatuses is sometimes provided with a mode in which a specific administrator or a person in charge of maintenance operates a special setting, such as security. In this case, there is a risk that the special mode is used by a general user who obtained the above-described special command through a certain method.

Biometrics is one mechanism for performing individual authentication without password input. A conventional technique related to authentication processing including biometrics is discussed in Japanese Patent Application Laid-Open No. 2013-122680. In the technique discussed in Japanese Patent Application Laid-Open No. 2013-122680, feature quantities of biometric information converted by using a unidirectional function (in the present patent specification, this information is referred to as biometric information) are registered in association with a user identifier (ID). When a user ID and biometric information are input, the technique compares the input user ID and biometric information with the registered user ID and biometric information to perform individual authentication.

In recent years, Fast Identity Online (FIDO) has attracted attention as a new authentication system including biometrics.

Unlike a password in ID/password authentication, biometric information used in biometrics, such as the fingerprint or vein, cannot be changed and updated. In biometrics, therefore, information leakage is fatal. On the other hand, when performing personal identification through FIDO, authentication processing itself is performed not on a server via a network such as the Internet but on a user terminal. For this reason, a FIDO system has few risks of information leakage because biometric information does not flow in the network.

To prevent a user from improperly using a special mode of a network device, it is desirable to introduce biometrics. However, if the technique discussed in Japanese Patent Application Laid-Open No. 2013-122680 is employed, each user needs to pre-register the user ID and converted biometric information in an associative way to all of network devices of which special modes may be used by the user. It is not realistic, when maintaining and managing a network device, to register biometric information of a user to be temporarily dispatched as required to the network device.

SUMMARY OF THE INVENTION

According to an aspect of the present invention, a system includes a terminal having an authentication module configured to perform authentication processing, and a tamper-resistant storage area configured to store user's biometric information for the authentication processing and a secret key generated when the biometric information is registered, a network device provided with a communication function for communicating with the terminal, and a device management system in which a public key corresponding to the secret key is registered, wherein the device management system comprises a first memory storing instructions, and a first processor executing the instructions stored in the first memory causing the device management system to transmit verification data generated by the device management system and a whitelist including identification information corresponding to a user managed in association with the network device, in response to an authentication request from the network device, wherein the network device comprises a second memory storing instructions, and a second processor executing the instructions stored in the second memory causing the network device to transmit a request including the verification data and the whitelist to the terminal for the authentication processing, and wherein the terminal comprises a third memory storing instructions, and a third processor executing the instructions stored in the third memory causing the network device to generate a signature by using the verification data and the secret key identified by the authentication processing using biometric information by the authentication module, in a case where the identification information identified through the authentication processing for the user of the terminal by the authentication module is included in the whitelist, and transmit the generated signature to the network device, wherein the instructions stored in the second memory further cause the network device to transmit the signature to the device management system, and wherein the instructions stored in the first memory further cause the device management system to transmit to the network device a response to permit login by the user of the terminal, in a case where verification of the signature using the public key corresponding to the secret key is successful.

Further features of the present invention will become apparent from the following description of exemplary embodiments with reference to the attached drawings.

BRIEF DESCRIPTION OF THE DRAWINGS

FIG. 8 is a flowchart illustrating the biometric processing in the terminal according to the present exemplary embodiment.

FIG. 10 illustrates an example of a software configuration of a device management service according to the present exemplary embodiment.

DESCRIPTION OF THE EMBODIMENTS

Embodiments according to the present embodiment will be described below with reference to the accompanying drawings.

Figure 1:
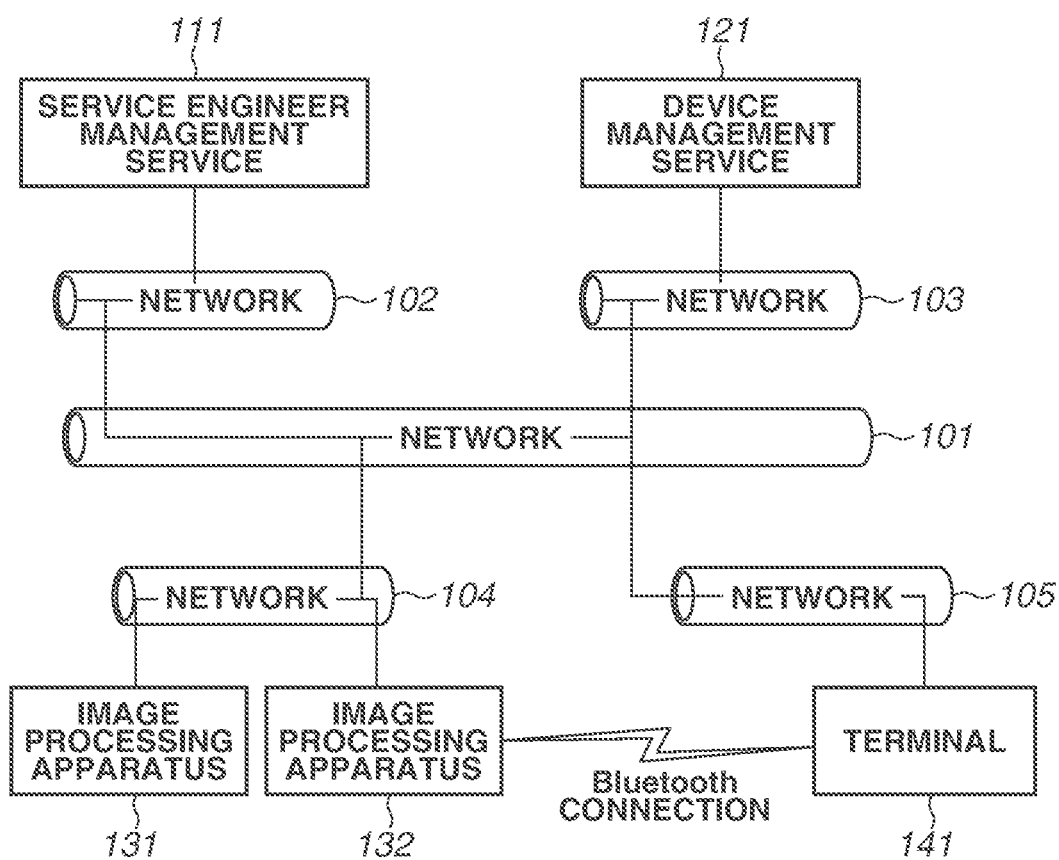
FIG. 1 illustrates an example of a system configuration according to the present exemplary embodiment.

FIG. 1 illustrates an overall configuration of a system according to embodiments of the present invention.

Referring to FIG. 1, a terminal 141, a device management service 121, and image processing apparatuses 131 and 132 are connected via networks 101 to 105. The image processing apparatuses 131 and 132 are examples of network devices under management by the device management service 121 according to the present embodiment. The present embodiment is applicable to image processing apparatuses including not only printers and multifunction peripherals including a printing unit (described below) but also network scanners, network cameras, digital medical apparatuses, and in-vehicle apparatuses such as car navigation systems. The present embodiment is also applicable to network devices, such as digital health appliances, home electric appliances, automobiles, robots, and other devices, which require specialized maintenance and management setting by a specific administrator.

The networks 101 to 105 include the Internet, local area networks (LANs), wide area networks (WANs), telephone lines, leased digital lines, automatic teller machines (ATMs), frame relay channels, cable television channels, and radio channels for data broadcasting. The networks 101 to 105 are communication networks implemented by combinations of these networks. The networks 101 to 105 needs to be capable of data transmission and reception. According to the present embodiment, the network 101 is the Internet, and the networks 102 to 105 are in-house networks and service provider networks.

The terminal 141 is implemented by a portable terminal (such as a mobile phone, smart phone, and tablet terminal) or a wrist watch type or spectacle type wearable terminal incorporating a program execution environment. For example, the terminal 141 includes an environment for executing applications which provide a web browser and a telephone function. The terminal 141 includes a sensor or camera for acquiring biometric information for individual authentication and executes a program for verifying and authenticating the biometric information.

The present embodiment will be described in detail below centering on a case where the terminal 141 is a portable terminal of a user such as a service engineer in charge of maintenance of devices under management by the device management service 121.

By accessing the device management service 121 through the terminal 141, a service engineer can check information about an image processing apparatus to which the service engineer is dispatched. The terminal 141 is connectable to the image processing apparatus via a wireless circuit such as Bluetooth (registered trademark) or a wired circuit.

The device management service 121 is provided by a device management system executed on one or more server computers. The device management service 121 remotely manages life cycle management for network devices (collection of operation information and management of contract information), dispatching of service engineers (referred to as service engineer dispatch processing), and installation operations. The device management service 121 can remotely control authentication processing for an operation to be performed by devices under management.

The image processing apparatuses 131 and 132 have a function of providing a special mode (for example, service mode) in which a service engineer or specific administrator performs maintenance operations.

Figure 2A:
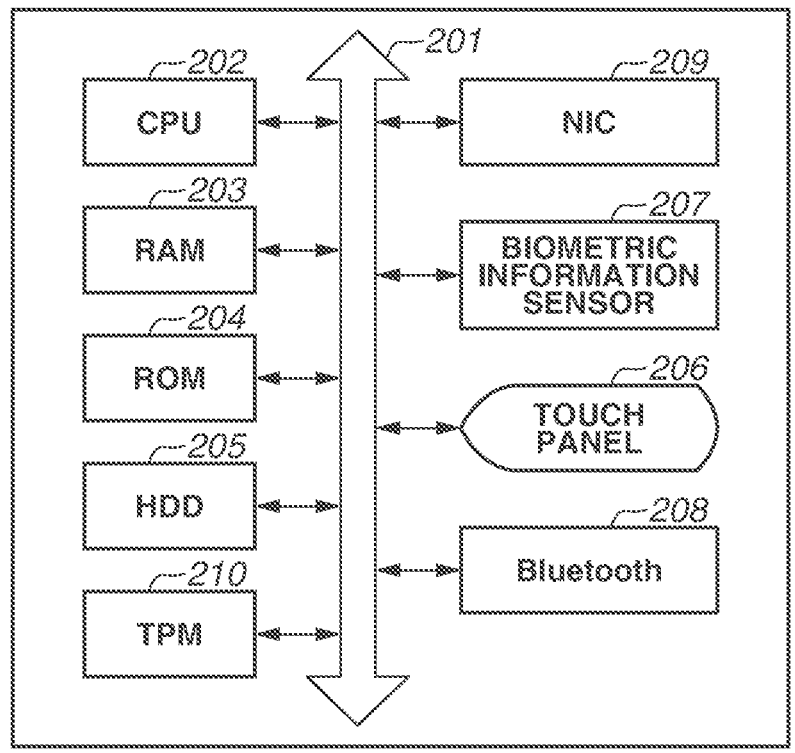
FIG. 2A illustrates an example of a hardware configuration of a terminal according to the present exemplary embodiment.
Figure 2B:
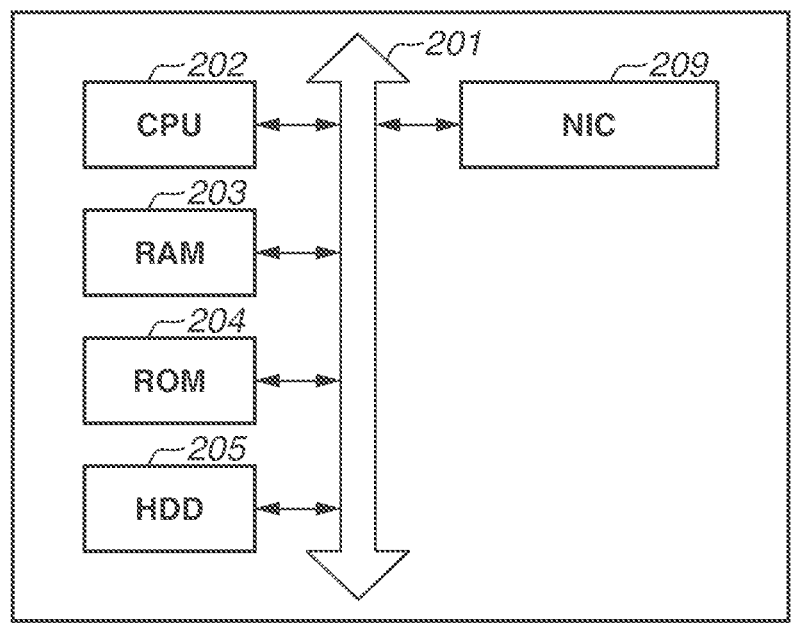
FIG. 2B illustrates an example of a hardware configuration of an information processing apparatus according to the present exemplary embodiment.

FIGS. 2A and 2B illustrate examples of hardware configurations of the terminal 141 and device management services 111 and 121 according to the present embodiment.

FIG. 2A illustrates an example of a hardware configuration of the terminal 141. FIG. 2B illustrates an example of a hardware configuration of a server computer on which the device management services 111 and 121 operate. Similar components are assigned the same reference numerals, and duplicated descriptions thereof will be omitted.

Referring to FIG. 2A, a central processing unit (CPU) 202 controls the entire apparatus. The CPU 202 executes application programs and an operating system (OS) stored in a hard disk drive (HDD) 205 and also performs control to temporarily store information and files needed for program execution in a random access memory (RAM) 203. A read only memory (RCM) 204 is a storage unit for storing various data, such as basic input/output (I/O) programs. The RAM 203 as a temporary storage unit functions as the main memory of the CPU 202 and a work area. The HOD 205 is one of external storage units and functions as a large volume memory for storing application programs such as a web browser, programs of a service server group, OS, and related programs.

A Trusted Platform Module (TPM) 210 is a tamper-resistant security chip which functions independently of the OS and hardware components. The TPM 210 serves as a storage unit for processing and storing confidential information. According to the present embodiment, the TPM 210 stores user's biometric information (or feature quantities thereof) to be used for biometrics, and a secret key needed for authentication processing (described below). The present embodiment may also be implemented by allocating as a substitution of the TPM 210 a secure memory space separately operating on one chip to achieve tamper resistance and providing a storage unit for managing user's biometric information (or feature quantities thereof) and a secret key in the memory space. A touch panel 206 having two (display and input) functions displays an application screen and keyboard. When the user applies pressure to the screen with a hand or dedicated pen, the touch panel 206 outputs information about the touched screen position to the outside as an information signal. When the application uses the output signal information, the application allows the user to operate the application through the touch panel 206.

A biometric information sensor 207 reads user's biometric information, for example, information about user's fingerprint, iris, and vein and converts the information into a signal. Although, in the present patent specification, a fingerprint read sensor is assumed as the biometric information sensor 207, other biometric information sensors such as a camera are also applicable. The user may touch the touch panel 206 or input information, and the biometric information sensor 207 may simultaneously read fingerprint information and convert the information into an electric signal.

A Bluetooth 208 is a transmitter/receiver which performs Bluetooth communication. When the Bluetooth 208 is connected with another Bluetooth-based apparatus, these apparatuses can communicate with each other. A system bus 201 manages data flows in an apparatus. A Network Interface Card (NIC) 209 performs data exchange with an external apparatus via the networks 101 to 104. The above-described computer configuration is to be considered as an example and is not limited to the examples of configurations illustrated in FIGS. 2A and 2B. For example, data and program storage destinations can be changed between the ROM 204, RAM 203, and HDD 205 depending on features thereof. The computer configuration can include a universal serial bus (USB) interface. The biometric information sensor 207 and the Bluetooth 208 can be implemented by external hardware connected via a USB. When the terminal 141 is a mobile phone, for example, the computer configuration can also include other components (not illustrated), such as hardware for a telephone call function.

Figure 4:
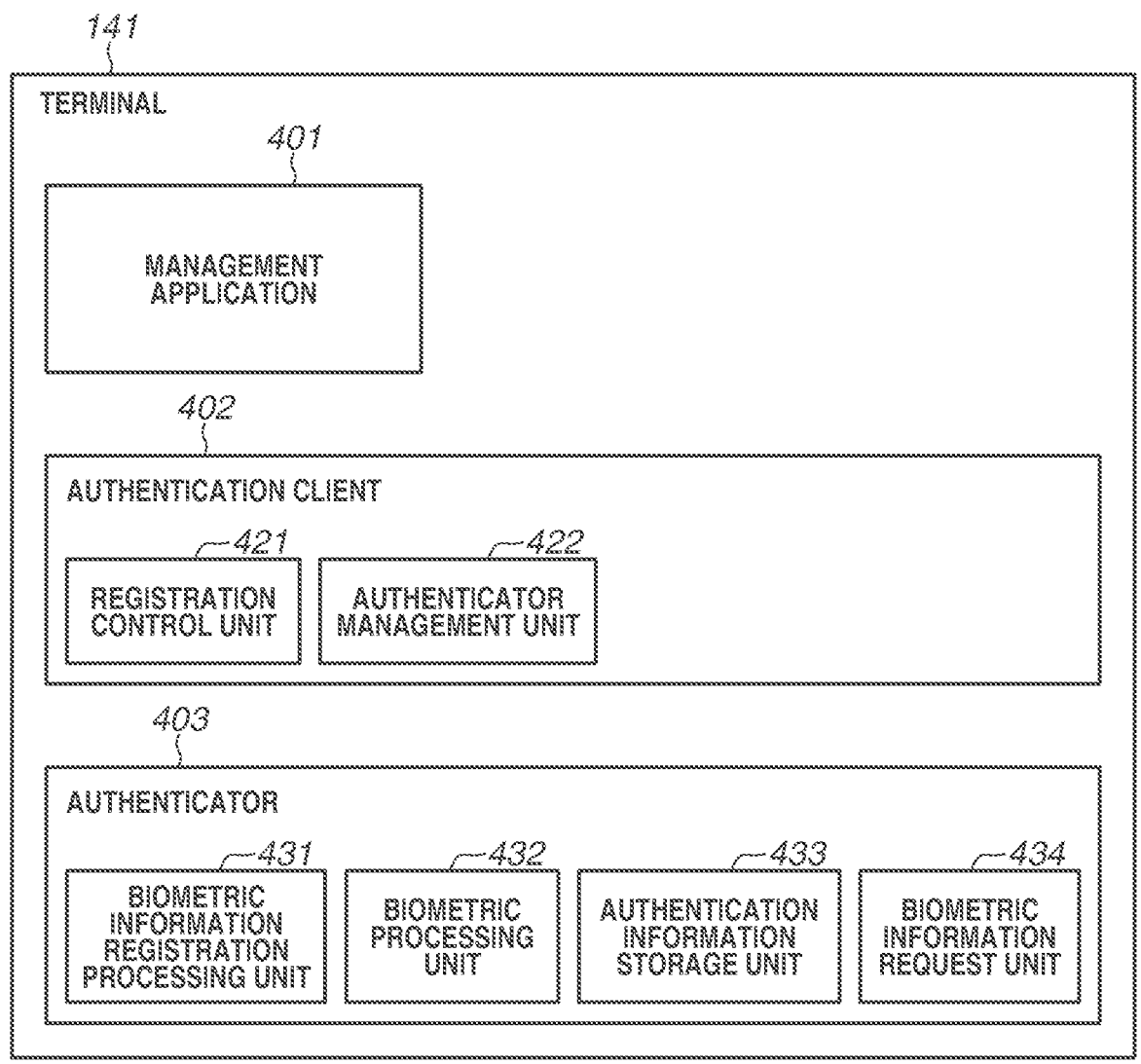
FIG. 4 illustrates an example of a software configuration of the terminal according to the present exemplary embodiment.
Figure 6:
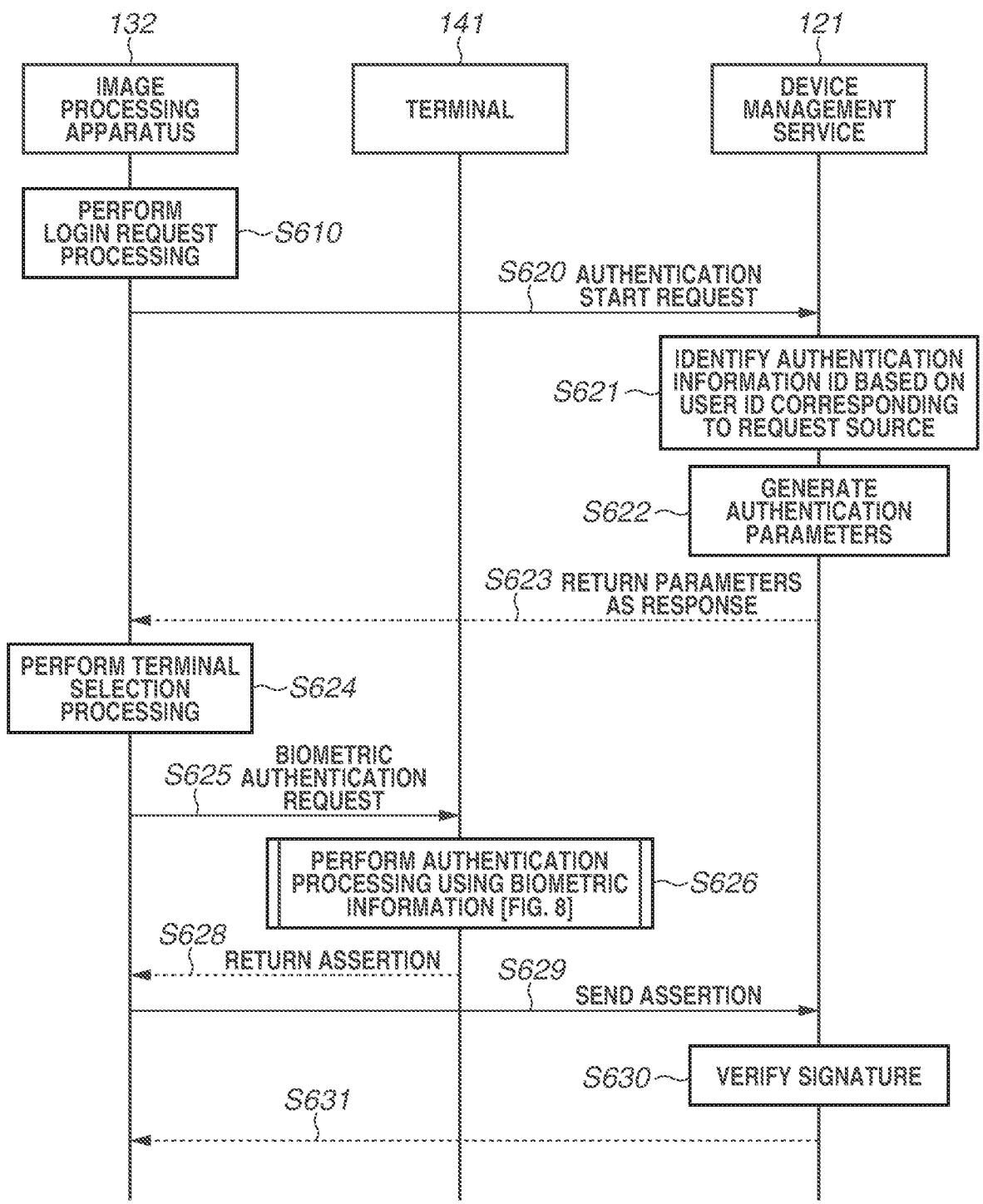
FIG. 6 is a sequence diagram illustrating an overview of entire processing including biometric processing according to the present exemplary embodiment.

In addition, when the CPU 202 performs processing based on a program stored in the HDD 205, the software configurations illustrated in FIGS. 4 and 10 and processing in each step of the flowchart illustrated in FIG. 6 are implemented.

Figure 3:
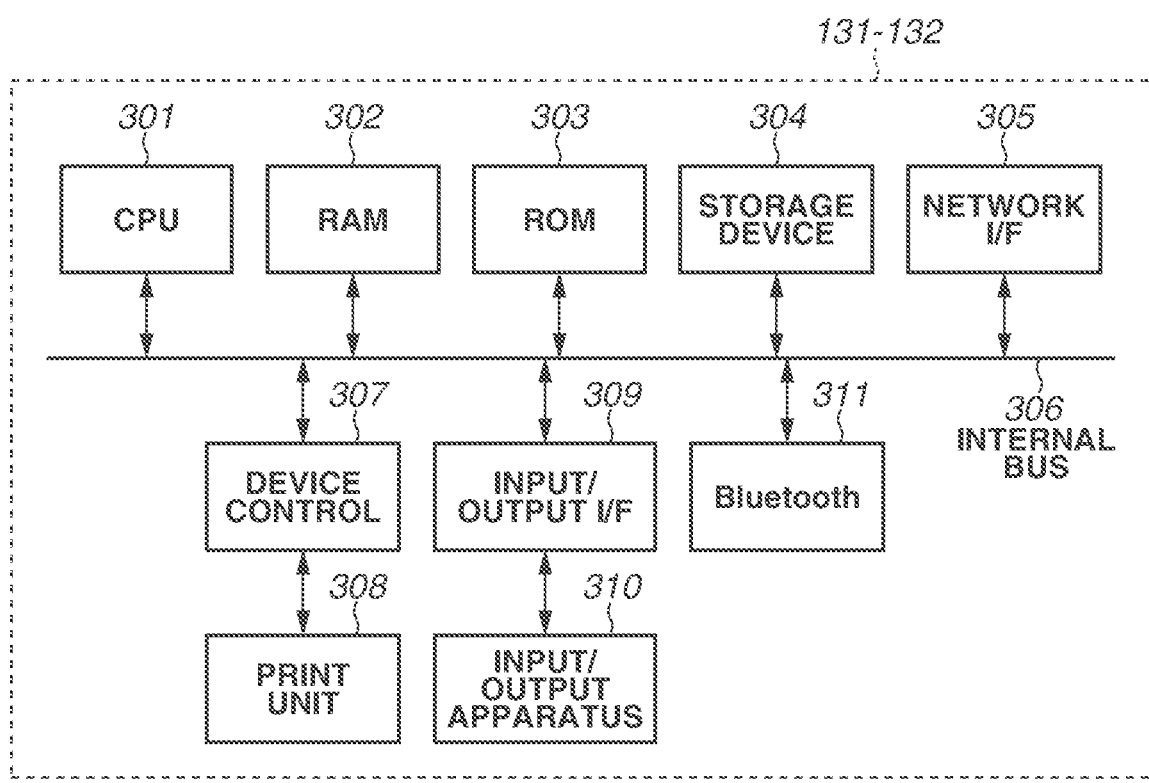
FIG. 3 illustrates an example of a hardware configuration of image processing apparatuses according to the present exemplary embodiment.

FIG. 3 illustrates an example of a hardware configuration of the image processing apparatuses 131 and 132 as examples of network devices according to the present embodiment. Examples of the image processing apparatuses 131 and 132 include digital multifunction peripherals, facsimile machines, and printers.

Each of the image processing apparatuses includes a CPU 301, a RAM 302, a ROM 303, a storage device 304, a network interface (I/F) 305, an internal bus 306, a device control 307, and a printing unit 308 including a fixing unit. The CPU 301 is provided with programs stored in the ROM 303, including programs for implementing the software configuration illustrated in FIG. 5 and the flowchart illustrated in FIG. 6 (described below), and totally controls devices via the internal bus 306.

The ROM 303 also stores destination information which means the region to where the image processing apparatus is to be shipped. The language to be displayed by an input/output apparatus 310 is determined by the destination information. The RAM 302 functions as the main memory of the CPU 301 and a work area. The network I/F 305 performs unidirectional or bidirectional data exchange with external networking apparatuses, server computers, and personal computers (PCs) via the networks 101 to 104. The device control 307 controls the printing unit 308. The CPU 301 performs processing for executing a program in corporation with the RAM 302 and the ROM 303 and performs processing for recording image data in a recording medium such as the storage device 304.

The storage device 304 functions as an external storage for storing image data and the like. Counter information, system information including special security settings, and monitoring information can be also stored in the storage device 304 instead of the backup RAM 302. The input/output apparatus 310 includes a plurality of input/output components in the image processing apparatuses 131 and 132. More specifically, the input/output apparatus 310 receives an input (such as a button input) from the user and transmits the signal corresponding to the input to each processing unit via an input/output I/F 309. The input/output apparatus 310 further includes a display apparatus (such as a touch panel) for providing the user with required information and receiving a user operation. The input/output apparatus 310 may further include a scanning apparatus for reading a document and receiving electronic data as input data. A Bluetooth 311 is a transmitter/receiver for performing Bluetooth communication. When the Bluetooth 311 is connected with another Bluetooth-based apparatus such as the terminal 141, these apparatuses can communicate with each other.

FIG. 10 illustrates a software module configuration implemented by the device management service 121. The device management service 121 includes a dispatch unit 1001 and a user management unit 1002.

The dispatch unit 1001 includes a dispatch information storage unit 1011 and provides a function of dispatching a service engineer so the image processing apparatus under management. Table 1 illustrates data stored in the dispatch information storage unit 1011 to manage dispatched service engineers.

TABLE 1

| Dispatch ID | Device serial No. | Service engineer ID |
|---|---|---|
| f70aa7c6-438b | AAA012345 | serviceman-a |
| f1157fe2-83b9 | AAA012345 | serviceman-b |
| 8ac100ad-c538 | BBB123456 | serviceman-x |
| . | . | . |
| . | . | . |
| . | . | . |

The "Dispatch ID" column stores unique IDs for dispatch processing in the device management service 121. The "Device serial No." column stores information (for example, device serial number) for uniquely identifying the image processing apparatuses 131 and 132 to which a service engineer is dispatched. The "Service engineer ID" column indicates user identification information of service engineers dispatched to the image processing apparatuses 131 and 132 in the device management service 121.

Although not illustrated, the validity period of dispatching can also be managed based on Table 1. With this management, if a network device (image processing apparatus) issues an authentication start request after expiration of the validity period in processing illustrated in FIG. 6 (described below), login can be prohibited.

The user management unit 1002 further includes an authentication processing unit 1022, an authentication information storage unit 1023, and a user data storage unit 1024. The user management unit 1002 provides dispatched service engineers with the basic authentication function and biometrics function for the image processing apparatuses 131 and 132. The user data storage unit 1024 manages data of service engineers as illustrates in Table 2.

TABLE 2

| Service engineer ID | Mail address | Password |
|---|---|---|
| serviceman-a | serviceman-a@xxx.com | ******** |
| serviceman-b | serviceman-b@xxx.com | ******** |
| serviceman-c | serviceman-c@xxx.com | ******** |
| . | . | . |
| . | . | . |
| . | . | . |

Referring to Table 2, the "Service engineer ID" column is the same as the corresponding column of Table 1. The "Mail address" column indicates the mail address corresponding to the user in the "Service engineer ID" column. The user can log in the device management service 121 as a service engineer by inputting a pair of the value of the "Service engineer ID" column and the value of the "Password" column and performing basic authentication (password authentication).

The device management service 121 is able to collect apparatus information, operation information, failure information, etc. from each of the devices under management via networks and manage the devices in association with device identification information, such as the device serial number. By using an application, such as a web browser of the terminal, a user who logged in the image processing apparatus 132 as a service engineer can view the managed information on the website provided by a web server (not illustrated) of the device management service 121.

FIG. 4 illustrates an example of a software module configuration of the terminal 141. The terminal 141 includes function of a management application 401, an authentication client 402, and an authenticator 403.

According to the present embodiment, the authenticator 403 software for managing the authentication information as biometric information within an information processing apparatus in association with the biometric information sensor 207 as an authenticator and controlling the biometric information sensor 207. Each terminal can be connected with a plurality of authenticators each of which can be controlled to manage information about a plurality of biometric information sensors. An authenticator can be implemented in a biometric information sensor which is wirelessly and externally connected with a terminal.

The management application 401 is used to access the device management service 121 to use services provided by the device management service 121. For example, the management application 401 is provided with functions of acquiring and displaying the operation information of the image processing apparatuses 131 and 132 from the device management service 121.

The authentication client 402 includes a registration control unit 42 and an authenticator management unit 422 and manages information needed for the authentication for using the device management service 121, and one or more authenticators. In a FIDO-based system, the authentication client 402 corresponds to a FIDO client.

The authenticator 403 is an authentication module mainly for controlling authentication processing within a terminal using biometric information and manages information needed for the authentication with the device management service 121. The authenticator 403 includes a biometric information registration processing unit 431, a biometric processing unit 432, an authentication information storage unit 433, and a biometric information request unit 434. The authentication information storage unit 433 stores information needed for authentication in the TPM 210. The needed information includes the user's biometric information and information about a secret key which forms a pair with the public key to be registered to the device management service 121. The biometric information to be stored in the TPM 210 is used for the biometric authentication. Examples of biometric information include data formed by reading a living body such as a fingerprint and face image by using a sensor and then converting the read image into an electrical signal, or feature quantities of the data.

In addition, at least either one of the authentication client 402 and the authenticator 403 can also be implemented as a function of software packed together with the OS operating on the terminal 141 or a function of the OS.

The following describes processing for registering information needed by the user to use the device management service 121 on the terminal 141.

First of all, the management application 401 of the terminal 141 accesses the device management service 121. If the management application 401 is a web browser and the device management service 121 is a web application accessed by the web browser, the registration processing may be implemented by JavaScript. The device management service 121 requests the management application 401 to input a user ID and password and waits for an input from the user. If the user inputs the user ID and password registered in the device management service 121 and instructs the device management service 121 to start the registration processing, the device management service 121 starts the registration processing.

Then, the device management service 121 requests the authentication client 402 and the authenticator 403 to perform processing for inputting biometric information via the management application 401 of the terminal 141.

The biometric information request unit 434 receives the input biometric information such as fingerprint information from the user via the biometric information sensor 207. After biometric information is input, unique identification information (biometric information ID) corresponding to the input biometric information on a one-to-one basis is assigned to the input biometric information, and the biometric information is stored in the TPM 210.

Subsequently, the biometric information registration processing unit 431 generates a pair of a public key and a secret key corresponding to the biometric information ID. Then, the authentication information storage unit 433 stores in the TPM 210 the service ID for identifying the device management service 121, the generated secret key, and the biometric information ID in an associative way, as illustrated in Table 3. The user ID can also be managed together with these pieces of information (not illustrated).

TABLE 3

| Authentication information ID | Service ID | Secret key | Biometric information ID |
|---|---|---|---|
| 407c-8841-79d | service-a.com | 1faea2da-a269-4fa7-812a-509470d9a0cb | d493a744 |
| 4c04-428b-a7a2 | service-a.com | d7ae30c8-3775-4706-8597-aaf681bc30f5 | dcc97daa |
| 92b2-498d-bea6 | twitter.com | 36ae5eed-732b-4b05-aa7b-4dddb4be3267 | 51caacaa |
| . | . | . | . |
| . | . | . | . |
| . | . | . | . |

Referring to Table 3, the "Authentication information ID" column manages unique identification information which is given to each combination of the service ID, secret key, and biometric information ID. The "Service ID" column stores information about a top-level domain and a second level domain of the device management service 121. The "Secret key" column stores the above-described secret keys. The "Biometric information ID" column stores the biometric information ID as described above.

The biometric information registration processing unit 431 transfers to the authentication client 402 the secret key stored in the TPM 210, a public key which forms a pair with the secret key, and the authentication information ID corresponding to the secret key. The registration control unit 421 transmits the authentication information ID and the public key to the device management service 121 via the management application 401.

The device management service 121 stores and manages the service engineer ID (identification information of the user having the service engineer's authority) and password in association with the transmitted authentication information ID and public key. Table 4 illustrates an example of a part of a data table managed by the device management service 121.

TABLE 4

| Authentication information ID | Public key | Service ID |
| --- | --- | --- |
| 407c-8841-79d | AC43C5FB-BFA2-48D1-A71B-FB04ACDA347A | serviceman-a |
| 4c04-428b-a7a2 | 8143CA9F-35C9-4333-948F-BFCE66A74310 | serviceman-b |
| . | . | . |
| . | . | . |
| . | . | . |

In association with the service engineer ID, the "Authentication information ID" and the "Public key" columns store the authentication information ID and the public key, respectively, transmitted from the authentication client 402 via the management application 401.

Figure 5:
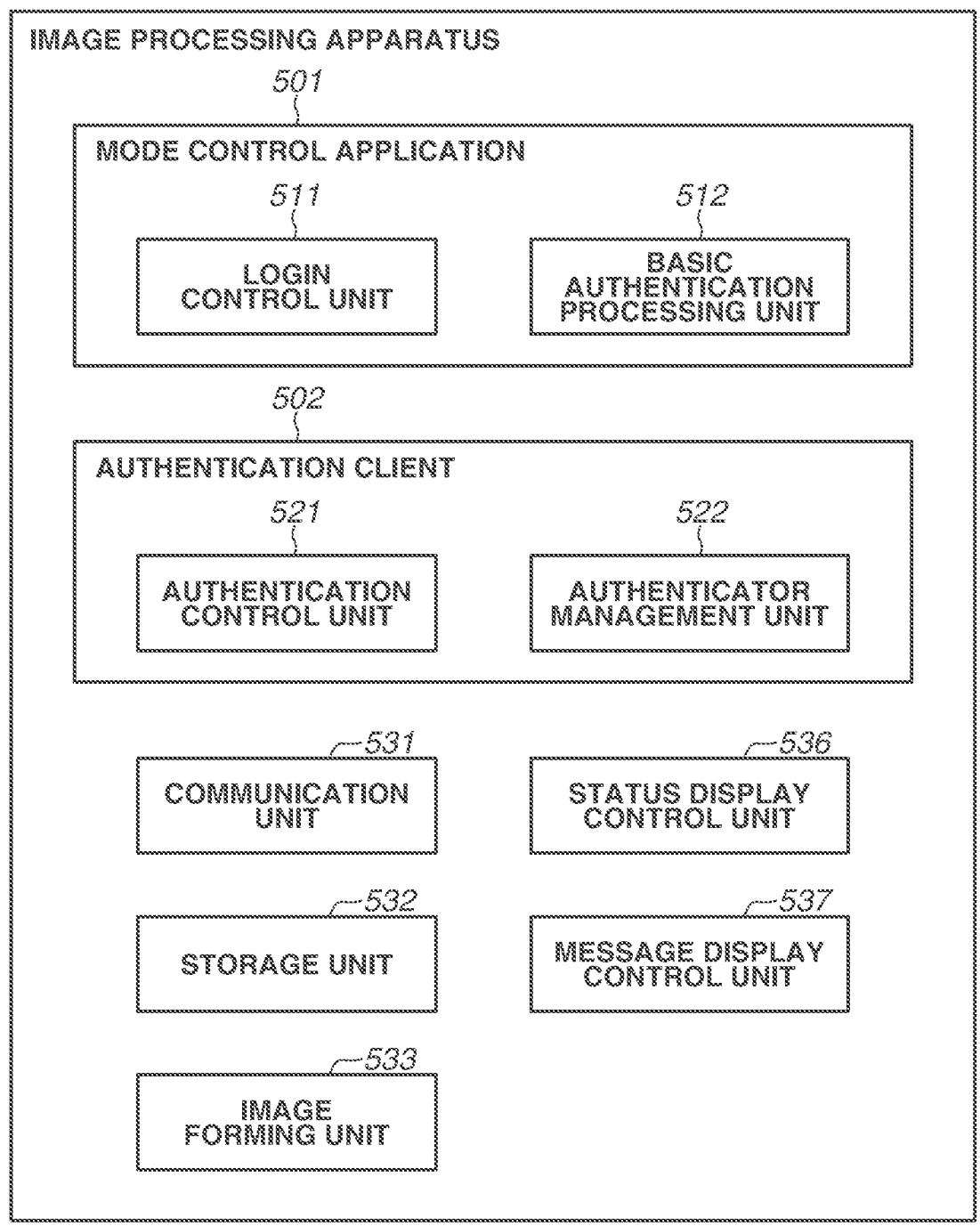
FIG. 5 illustrates an example of a software configuration of the image processing apparatuses according to the present exemplary embodiment.

FIG. 5 illustrates an example of a soft module configuration of the image processing apparatuses 131 and 132. Each of the image processing apparatuses 131 and 132 includes a communications unit 531, a storage unit 532, an image forming unit 533, a status display control unit 536, and a message display control unit 537.

The communications unit 531 transmits device information related to the image processing apparatuses 131 and 132 to the device management service 121 and receives information transmitted from the device management service 121. The communications unit 531 performs communication based on Simple Mail Transfer Protocol (SMTP) and Hypertext Transfer Protocol (HTTP)/Hypertext Transfer Protocol Secure (HTTPS) for information transmission and reception. The storage unit 532 exchanges information with storage areas including the RPM 302, the RPM 303, and the storage device 304. The storage unit 532 also stores the device information of the image processing apparatuses 131 and 132 internally generated by the apparatuses. The device information includes the device identification information such as the device serial number and communication information such as the Internet Protocol (IP) address. The storage unit 532 also stores counter information, error occurrence information, and other various operation information. The image forming unit 533 forms an output image by using input data. For example, the image forming unit 533 has a function of generating printing data to be printed on paper by the printing unit 308.

The status display control unit 536 performs control to display a notification about the status information of the image processing apparatuses 131 and 132 in the status bar of the input/output apparatus 310. The status display control unit 536 also performs control to display in the status bar a notification about an incoming message in response to the acquisition of instruction information from the device management service 12. The message display control unit 537 starts a browser function (web browser) in response to a user operation and controls display of a message from the device management service 121.

The mode control application 501 includes a login control unit 511 and a basic authentication processing unit 512. The mode control application 501 is used to control the transition to the service mode for offering special functions (referred to as service engineer functions in the present specification) which can be operated only by a service engineer on the image processing apparatuses 131 and 132. Alternatively, the mode control application 501 can be configured to offer service engineer functions. Examples of service engineer functions possibly include a counter reset function and a parameter operation function for maintenance.

The mode control application 501 also offers, as the login control unit 511, a function of controlling login operations on the image processing apparatuses 131 and 132 for a mode transition from the normal mode used by a general user to the service mode. When the service engineer uses biometrics as a login method, the mode control application 501 will request the authenticator 403 of the terminal 141 for biometrics via an authentication client 502. According to the result of biometric processing on the terminal 141, the service engineer performs login processing, and the image processing apparatus enters the service mode.

The authentication client 502 includes an authentication control unit 521 and an authenticator management unit 522 and manages one or more authenticators. In a FIDO-based system, the authentication client 502 corresponds to a FIDO client. The authentication client 502 can also be implemented as a function of software packed together with the OS operating on the image processing apparatuses 131 and 132 or a function of the OS.

FIG. 6 is a sequence diagram illustrating a procedure of processing when the user as a service engineer dispatched from the device management service 121 logs in the image processing apparatus 132 to use a special function offered in the service mode. The processing will be described below centering on a case where the service engineer connects his or her terminal 141 and the image processing apparatus 132 via the Bluetooth 208, as illustrated in FIG. 1. The Bluetooth connection allows the authentication client 502 of the image processing apparatus 132 to recognize the authenticator 403 of the connected terminal 141 as an external authenticator. Therefore, the authenticator 403 of the connected terminal 141 is managed by the authenticator management unit 522 of the image processing apparatus 132.

In the sequence illustrated in FIG. 6, communication between the image processing apparatus 132 and the terminal 141 is performed between the authentication client 502 of the image processing apparatus 132 and the authenticator 403 of the terminal 141 via the OS of each terminal.

In step S610, the image processing apparatus 132 performs login request processing according to an input operation by the user. Examples of user's input operations include an operation performed by a service engineer to instruct the image processing apparatus 132 to start the service mode. This instruction is received by the login control unit 511. In step S620, the login control unit 511 issues an authentication start request to the authentication processing unit 1022 of the device management service 121. The authentication start request includes the device identification information (for example, device serial number) of the image processing apparatus 132 as request source information.

In step S621, referring to Table 1, the authentication processing unit 1022 identifies the service engineer ID dispatched for the device identification information of the request source. Referring to Table 1, when the device serial number of the image processing apparatus 132 is "AAA012345", users having the service engineer's authority registered as dispatched "serviceman-a" and "serviceman-b" are permitted to log in the image processing apparatus 132. Then, referring to Table 4, the authentication processing unit 1022 identifies the values in the "Authentication information ID" column corresponding to "serviceman-a" and "serviceman-b" in the "Service engineer ID" column.

Figure 7A:
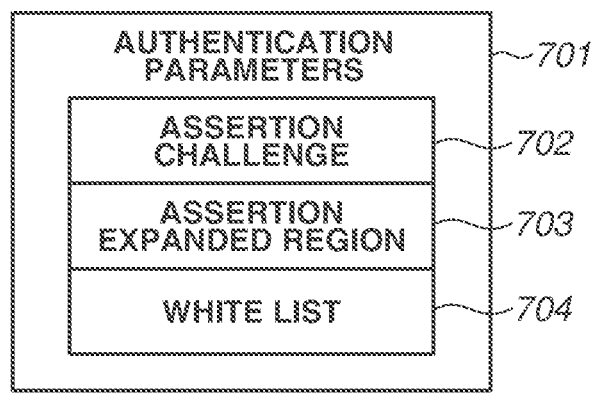
FIGS. 7A, 7B, and 7C illustrate examples of data tables according to the present exemplary embodiment.

In step S622, the authentication processing unit 1022 generates authentication parameters 701 illustrated in FIG. 7A. The authentication parameters 701 include an Assertion challenge 702, an Assertion extended region 703, and a whitelist 704.

The Assertion challenge 702 refers to verification data used to perform challenge response authentication. The Assertion extended region 703 stores extended parameters which can be specified by the device management service 121 to control operations of the authentication client 502 and the authenticator 403.

The whitelist 704 is a list of parameters specified by the device management service 121 to restrict users who are permitted to log in the image processing apparatus 132 in the service mode when the authentication is successful. According to the present embodiment, the authentication processing unit 1022 sets the value of the authentication information ID identified in step S621.

In step S623, the authentication processing unit 1022 returns, as a response, the authentication parameters 701 generated in step S622 to the login control unit 511.

Figure 9A:
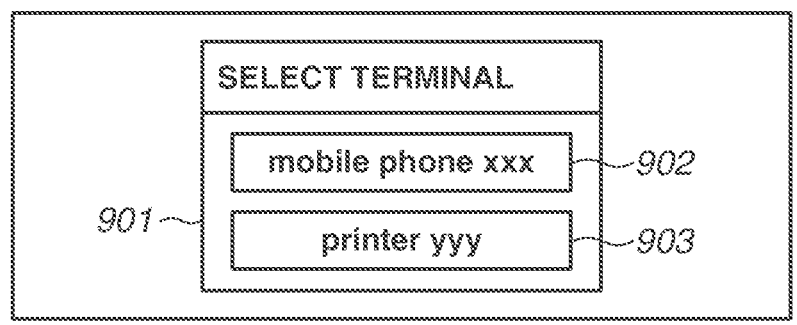
FIGS. 9A, 9B, and 9C illustrate examples of screens displayed on the terminal and image processing apparatuses according to the present exemplary embodiment.

In step S624, the login control unit 511 transfers the authentication parameters 701 to the authentication control unit 521 to request it for authentication. The authentication control unit 521 displays a terminal selection screen 901 illustrated in FIG. 9A on the input/output apparatus 310 of the image processing apparatus 132. Selection candidates 902 and 903 displayed in the terminal selection screen 901 are names of devices having authenticators managed by the authenticator management unit 522. The device names may be identifiers of devices having authenticators. The selection candidate 902 indicates an authenticator existing in the terminal 141, and the selection candidate 903 indicates an authenticator existing in the image processing apparatus 132. According to the present embodiment, the authentication control unit 521 receives a selection of the terminal 141 as apparatus for performing authentication from the user via the terminal selection screen 901. When biometric information is pre-registered in the image processing apparatuses 131 and 132, the user may select the image processing apparatus indicated by the selection candidate 903 ("printer yyy").

Figure 9B:
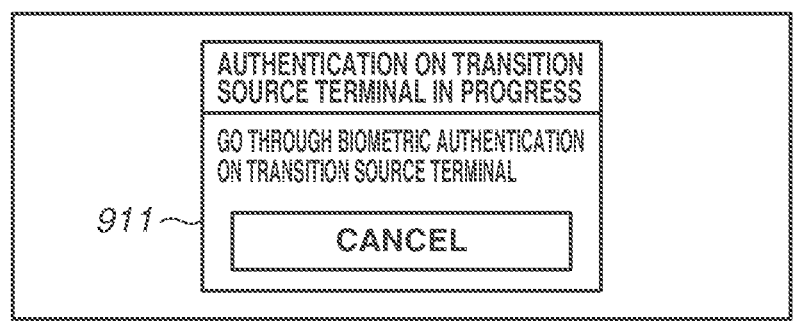

When the authentication control unit 521 receives a selection of the terminal 141 as an apparatus for performing authentication via the terminal selection screen 901, the authentication control unit 521 displays a terminal authentication screen 911 illustrated in FIG. 9B on the input/output apparatus 310 of the image processing apparatus 132. The screen 911 is left displayed until the terminal 141 returns a notification about a result of biometrics in step S628.

Figure 7B:
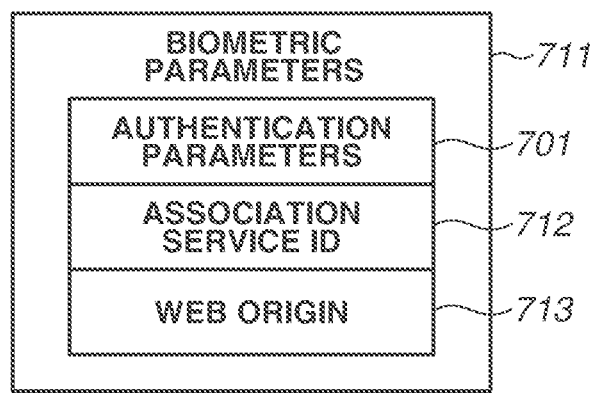

In step S625, the authentication control unit 521 issues a biometrics request to the biometric processing unit 432 of the terminal 141 and transmits the biometrics parameters 711. The biometrics parameters 711 illustrated in FIG. 7B includes the authentication parameters 701, an association service ID 712, and a WebOrigin 713. The WebOrigin 713 is the Uniform Resource Locator (URL) of the device management service 121 accessed in step S621, and the association service ID 712 is information about the top-level domain and the second level domain of the device management service 121.

In step S626, the terminal 141 performs biometric processing. The biometric processing will be described in detail below with reference to FIG. 8.

Figure 7C:
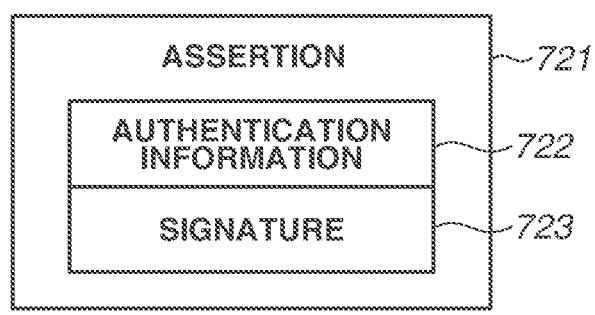

In step S628, the biometric processing unit 432 returns, as an Assertion 721, a signature 723 generated as a result of the biometric processing performed by the terminal 141 to the login control unit 511 via the authentication control unit 521. The Assertion 721 illustrated in FIG. 7C includes authentication information 722 and the signature 723. The authentication information 722 and the signature 723 correspond to the authentication information ID and the signature value, respectively, identified in the biometric processing performed by the terminal 141.

In step S629, the login control unit 511 transmits the Assertion 721 to the authentication processing unit 1022 of the device management service 121. The device management service 121 receives the Assertion 721 including the signature 723.

In step S630, referring to Table 4, the authentication processing unit 1022 identifies the public key corresponding to the authentication information ID included in the authentication information 722 of the Assertion 721. The authentication processing unit 1022 further decrypts the signature 723 of the Assertion 721 based on the identified public key to verify the validity of the Assertion 721. The validity of the Assertion 721 is assumed to have been verified when the Assertion challenge 702 generated in step S622 can be restored from the signature 723.

In step S631, the authentication processing unit 1022 transmits a login permission response to the login control unit 511. Upon reception of the login permission response from the authentication processing unit 1022 in step S631, the login control unit 511 permits the user for login based on the service engineer's authority. Thus, the service engineer is allowed to use special functions offered in the service mode on the image processing apparatus 132.

The biometric processing (step S626) performed by the terminal 141 will be described in detail below with reference to the flowchart illustrated in FIG. 8. This processing is implemented when the CPU 202 of the terminal 141 executes a program related to the processing.

Figure 9C:
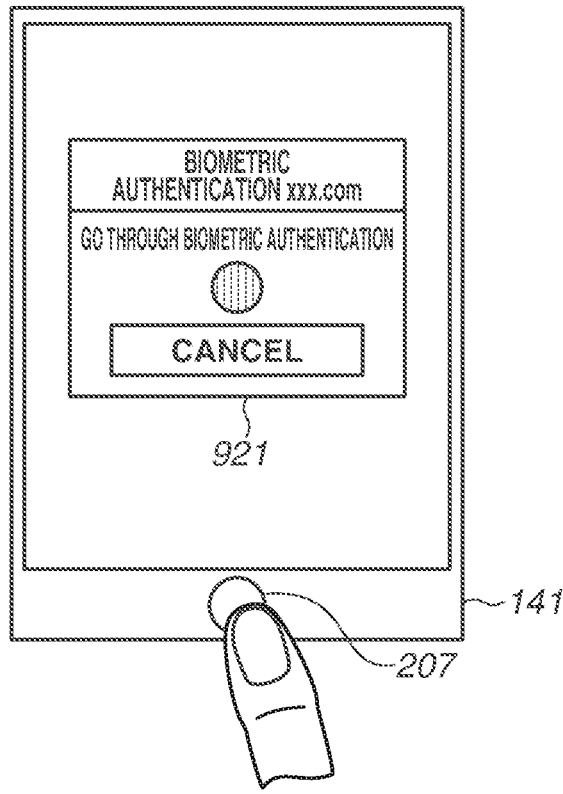

In step S811, the biometric processing unit 432 displays a biometric information input request screen 921 illustrated in FIG. 9C on the touch panel 206 of the terminal 141. This prompts the user to present biometric information to the biometric information sensor 207. In step S812, the biometric processing unit 432 receives an input of the user's biometric information via the biometric information sensor 207. At this timing, the biometric processing unit 432 acquires (feature quantities of) the user's biometric information read by the biometric information sensor 207, via the biometric information request unit 434. For example, feature quantities of biometric information are information unique to individuals, such as a fingerprint pattern, iris pattern, and vein shape, converted into values holding uniqueness thereof. In biometrics, an individual is identified by using feature quantities unique to the individual.

In step S813, the biometric processing unit 432 identifies the biometric information ID corresponding to the input biometric information and determines whether the association service ID 712 in the biometrics parameters 711 has already been registered in Table 3 in association with the identified biometric information ID. When the association service ID 712 has already been registered. (YES in step S813), the processing proceeds to step S814. On the other hand, when biometrics using the input biometric information fails (when the biometric information ID cannot be identified) or when the association service ID 712 in the biometrics parameters 711 has not been registered in Table 3 (NO in step S813), the biometric processing unit 432 determines that the biometric processing has failed, transmits an authentication failure response to the image processing apparatus 132, and ends this processing.

In step S814, the biometric processing unit 432 determines whether the authentication information ID registered in table 3 in association with the identified biometric information ID exists in the whitelist 704 of the authentication parameters 701 in the biometrics parameters 711. When the authentication information ID exists in the whitelist 704 (YES in step S814), the processing proceeds to step S815. On the other hand, when the authentication information ID does not exist in the whitelist 704 (NO in step S814), the biometric processing unit 432 transmits an authentication failure response to the image processing apparatus 132 and ends this processing. When the authentication information ID registered in association with the identified biometric information ID does not exist in the whitelist 704, the biometric processing unit 432 may transmit this information as a response to the image processing apparatus 132.

In step S815, the biometric processing unit 432 identifies the secret key registered in Table 3 in association with be identified biometric information ID. In step S816, the biometric processing unit 432 generates the signature 723 based on the Assertion challenge 702 of the authentication parameters 701 in the biometrics parameters 711 by using the identified secret key.

A case where the association service ID 712 has not been registered in Table 3 (NO in step S813) is a case where the user having the service engineer's authority has not performed processing for registering the authentication information to the device management service 121. A case where the authentication information ID does not exist in the whitelist 704 (NO in step S814) is a case where the user having the service engineer's authority logging in the image processing apparatus 132 is a service engineer who is not dispatched by the device management service 121.

Example of Application

If a service engineer cannot use biometrics, for example, if the service engineer cannot perform processing for registering the authentication information to the device management service 121, the service engineer may prepare an additional method for logging in the device in the service mode through basic authentication using a user account and password.

More specifically, when the basic authentication processing unit 512 receives a basic authentication request issued to the image processing apparatuses 131 and 132 by the service engineer, the basic authentication processing unit 512 performs the basic authentication with the device management service 121. Detailed descriptions of the basic authentication will be omitted. The basic authentication processing unit 512 also transmits to the device management service 121 the device serial number together with the service engineer ID and password input by the service engineer. If the device management service 121 succeeds in the verification of the received service engineer ID and password and if the service engineer indicated by the service engineer ID for the device serial number has been dispatched, the device management service 121 permits authentication.

According to the first embodiment, the device management service 121 performs control, by using the whitelist 704, to permit or not to permit each user to log in a network device in a special mode. This enables providing a system in which only a service engineer actually dispatched to the image processing apparatus 132 can log in the apparatus in the service mode.

In some case of actual operations in management and maintenance of network devices, a user near a customer visits the customer, or a substitute user visits the customer for a certain reason.

The present embodiment will be described below centering on a mechanism for permitting, assuming such a case, a user group including a pre-specified user to log in the image processing apparatus 132 by using the whitelist 704.

A second embodiment largely differs from the first embodiment in that the whitelist 704 does not include the authentication information ID but includes the group ID as identification information indicating each group. Examples of group IDs include the affiliation ID representing a tenant or section to which a user belongs, the group ID representing a group to be assigned to a user, and the authority ID representing the authority to be assigned to a user. The present embodiment will be described below centering on the group ID.

According to the present embodiment, the user data storage unit 1024 of the device management service 121 further manages Table 5 (described below).

TABLE 5

| Affiliation ID | Group ID | Device serial No. |
|---|---|---|
| tenant001 | group001 | AAA012345 |
| tenant001 | group002 | AAA012345 |
| tenant001 | group003 | BBB123456 |
| . | . | . |
| . | . | . |
| . | . | . |

In this example, the "Affiliation ID" column manages the tenant ID for uniquely identifying companies in charge of sales of the image processing apparatuses 131 and 132. The "Group ID" column indicates the ID to be assigned to a service engineer group to which a plurality of users having the service engineer's authority in charge or management and maintenance belongs. Examples of service engineer groups include a group in charge of devices in the XX region and a group in charge of customers A, B, and C. More specifically, users belonging to the group having the group ID "group001" are dispatched to the image processing apparatus represented by the device serial number "AAA012345".

The user data storage unit 1024 of the device management service manages the follow Table 6 which includes Table 2 according to the first embodiment and the "Group ID" column added thereto.

TABLE 6

| Service engineer ID | Mail address | Password | Group ID |
|---|---|---|---|
| serviceman-a | serviceman-a@xxx.com | ******** | group001 |
| serviceman-b | serviceman-b@xxx.com | ******** | group001 |
| serviceman-c | serviceman-c@xxx.com | ******** | group002 |
| . | . | . | . |
| . | . | . | . |
| . | . | . | . |

The "Group ID" column is identical to the corresponding column in Table 5. This means that the users having service engineer ID "serviceman-a" and "serviceman-b" belong to the group having the group ID "group001".

The authentication information storage unit 433 of the terminal 141 manages the following Table 7 which includes Table 3 according to the first embodiment and the "group ID" column added thereto.

TABLE 7

| Authentication information ID | Service ID | Secret key | Biometric information ID | Group ID |
|---|---|---|---|---|
| 407c-8841-79d | service-a.com | 1faea2da-a269-4fa7-812a-509470d9a0cb | d493a744 | group 001 |
| 4c04-428b-a7a2 | service-a.com | d7ae30c8-3775- 4706-8597-aaf681bc30f5 | dcc97daa | group 001 |
| 92b2-498d-bea6 | twitter.com | 36ae5eed-732b-4b05-aa7b-4dddb4be3267 | 51caacaa | group 002 |
| . | . | . | . | . |
| . | . | . | . | . |
| . | . | . | . | . |

The "Group ID" column is identical to the corresponding column in Table 5. According to the present embodiment, when registering the biometric information to the device management service 121, the image processing apparatus 132 receives the group ID in Table 3 from the device management service 121.

The following describes an example of a processing sequence in which a user as a service engineer logs in the image processing apparatus 132 by using the terminal 141. This sequence is almost the same as the sequence according to the first embodiment illustrated in FIG. 6, and only differences therefrom will be described below.

According to the present embodiment, in step S622, the authentication processing unit 1022 of the device management service 121 acquires the group ID assigned to the device serial number of the target device from Table 5 and sets the group ID to the whitelist 704 in the authentication parameters 701. Similarly to the first embodiment, in step S623, the management service 121 transmits the authentication, parameters 701 to the image processing apparatus 132.

In step S814 in the biometric processing by the terminal 141 in step S626, the biometric processing unit 432 checks whether the group ID registered in Table 7 in association with the identified biometric information ID exists in the whitelist 704 of the authentication parameters 701 in the biometrics parameters 711. When the group ID corresponding to the identified biometric information ID exists in the whitelist 704 (YES in step S814), the processing proceeds to step S815. On the other hand, when the group ID corresponding to the identified biometric information ID does not exist in the whitelist 704 (NO in step S814), neither the secret key identification nor the signature generation is performed and the login operation by the user fails (login not permitted).

According to the present embodiment, a plurality of service engineers is to be dispatched to the image processing apparatus 132. Therefore, each user needs to determine whether he or she must go to the installation location of the image processing apparatus 132.

Therefore, upon completion of the processing in step S630, for example, the device management service 121 transmits a mail indicating that the target device is currently being handled by a service engineer to the users belonging to the group represented by the group ID assigned to the device serial number of the target device. The transmission destination can be identified by referring to Table 2. To check devices currently being handled, a web site where the device management service 121 provides the management application 401 with information about devices that have completed the procession in step S630 can be prepared for the user as the service engineer who can use the device management service 121.

Example of Application

According to the present embodiment, the group ID is included in the whitelist 704. For the whitelist 704, a plurality of authentication information IDs corresponding to a plurality of users belonging to the group represented by the group ID can be set. Similarly to the first embodiment, login control can be implemented by using the whitelist 704.

Both of the group ID and the authentication information ID corresponding to individual users can also be set in the whitelist 704. This makes it possible to implement login control using a whitelist in a more flexible way.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2017-148620, filed Jul. 31, 2017, which is hereby incorporated by reference herein in its entirety.

What is claimed is:

1. A system comprising:
a terminal having an authentication module configured to perform authentication processing, and a tamper-resistant storage area configured to store user's biometric information for the authentication processing and a secret key generated when the biometric information is registered;
a network device provided with a communication function for communicating with the terminal; and
a device management system in which a public key corresponding to the secret key is registered,
wherein the device management system comprises a first memory storing first instructions, and a first processor executing the first instructions causing the device management system to transmit verification data generated by the device management system and a whitelist including identification information corresponding to each of predetermined users who have been assigned the network device, in response to an authentication request from the network device,
wherein the network device comprises a second memory storing second instructions, and a second processor executing the second instructions causing the network device to transmit a request including the verification data and the whitelist to the terminal for the authentication processing, and
wherein the terminal comprises a third memory storing third instructions, and a third processor executing the third instructions causing the terminal to:
generate a signature by using the verification data and the secret key identified by the authentication processing using the biometric information by the authentication module, in a case where the identification information identified through the authentication processing for the user of the terminal by the authentication module is included in the whitelist; and
transmit the generated signature to the network device,
wherein the second instructions further cause the network device to transmit the signature to the device management system, and
wherein the first instructions further cause the device management system to transmit to the network device a response to permit login by the user of the terminal, in a case where verification of the signature using the public key corresponding to the secret key is successful.

2. The system according to claim 1, wherein the identification information corresponding to the user included in the whitelist is at least either one of identification information assigned in association with the secret key and the public key and generated when the user's biometric information is registered in the tamper-resistant storage area, and identification information for identifying a group to which the user belongs.

3. A method for a system including
a terminal comprising an authentication module configured to perform authentication processing, and a tamper-resistant storage area configured to store user's biometric information for the authentication processing and a secret key generated when the biometric information is registered;
a network device provided with a communication function for communicating with the terminal; and
a device management system in which a public key corresponding to the secret key is registered, the method comprises:
transmitting, in the device management system, verification data generated by the device management system and a whitelist including identification information corresponding to each of predetermined users who has been assigned for the network device, in response to an authentication request from the network device;
transmitting, in the network device, a request including the verification data and the whitelist to the terminal for the authentication processing;
generating, in the terminal, a signature by using the verification data and the secret key identified by the authentication processing using the biometric information by the authentication module, in a case where the identification information identified through the authentication processing for the user of the terminal by the authentication module is included in the whitelist;
transmitting, in the terminal, the generated signature to the network device;
transmitting, in the network device, the signature to the device management system; and
transmitting, in the device management system, to the network device a response to permit login by the user of the terminal, in a case where verification of the signature using the public key corresponding to the secret key is successful.

4. A device management system, in which a public key corresponding to a secret key is registered, that manages a network device provided with a communication function for communicating with a terminal, the device management system comprising:
a memory storing instructions; and
a processor executing the instructions causing the device management system to:
transmit verification data generated by the device management system and a whitelist including identification information corresponding to each of predetermined users who have been assigned the network device, in response to an authentication request from the network device for allowing the user of the terminal to log in to the network device;

receive, via the network device, a signature, generated using the secret key according to the whitelist and biometric authentication processing on the terminal for the user of the terminal, wherein the secret key is stored in a tamper-resistant storage area of the terminal; and transmitting to the network device a response to permit login by the user of the terminal, in a case where verification of the signature using the public key corresponding to the secret key is successful.

5. The device management system according to claim 4, wherein the identification information corresponding to the user included in the whitelist is at least either one of identification information assigned in association with the secret key and the public key and generated when the user's biometric information is registered in the tamper-resistant storage area, and identification information for identifying a group to which the user belongs.

6. A method for a device management system, in which a public key corresponding to a secret key is registered, that manages a network device provided with a communication function for communicating with a terminal, the method comprising:

transmitting verification data generated by the device management system and a whitelist including identification information corresponding to each of predetermined users who have been assigned the network device, in response to an authentication request from the network device for allowing the user of the terminal to log in to the network device;

receiving, via the network device, a signature, generated using the secret key according to the whitelist and biometric authentication processing on the terminal for the user of the terminal, wherein the secret key is stored in a tamper-resistant storage area of the terminal; and transmitting to the network device a response to permit login by the user of the terminal, in a case where verification of the signature using the public key corresponding to the secret key is successful.

7. A non-transitory computer readable storage medium on which is stored a computer program for making a computer execute a method for a device management system, in which a public key corresponding to a secret key is registered, that manages a network device provided with a communication function for communicating with a terminal, the method comprising:

transmitting verification data generated by the device management system and a whitelist including identification information corresponding to each of predetermined users who have been assigned the network device, in response to an authentication request from the network device for allowing the user of the terminal to log in to the network device;

receiving, via the network device, a signature, generated using the secret key according to the whitelist and biometric authentication processing on the terminal for the user of the terminal, wherein the secret key is stored in a tamper-resistant storage area of the terminal; and transmitting to the network device a response to permit login by the user of the terminal, in a case where verification of the signature using the public key corresponding to the secret key is successful.

* * * * *